United States Patent [19]

Kodaira

[11] Patent Number: 4,681,418
[45] Date of Patent: Jul. 21, 1987

[54] CAMERA

[75] Inventor: Takanori Kodaira, Tokyo, Japan

[73] Assignee: Canon Kabushiki Kaisha, Tokyo, Japan

[21] Appl. No.: 765,330

[22] Filed: Aug. 13, 1985

[30] Foreign Application Priority Data

Aug. 23, 1984 [JP] Japan .................................. 59-175773
Aug. 23, 1984 [JP] Japan .................................. 59-175774

[51] Int. Cl.$^4$ ............................................. G03B 17/02
[52] U.S. Cl. .................................. 354/288; 354/289.1
[58] Field of Search ................ 354/64, 289.1, 295, 354/296, 289.11, 288, 154, 202, 208, 219

[56] References Cited

U.S. PATENT DOCUMENTS

| 2,482,571 | 9/1949 | Arnold | 354/295 X |
| 2,952,195 | 9/1960 | Babcock et al. | 354/289.1 X |
| 3,611,896 | 10/1971 | Aoki | 354/202 |
| 3,633,475 | 1/1972 | Cooper | 354/202 |
| 4,597,657 | 7/1986 | Wakabayashi | 354/195.12 |

FOREIGN PATENT DOCUMENTS 58-138925 9/1983 Japan .
58-157311 10/1983 Japan .

Primary Examiner—Donald A. Griffin
Attorney, Agent, or Firm—Toren, McGeady & Associates

[57] ABSTRACT

A camera is provided with an operation member which is arranged for a lens cover and a filter to turn them in front of the photo-taking lens of the camera and to be shiftable between first, second and third positions thereof. With the operation member set in the first position, the front surface of the photo-taking lens is covered by the lens cover. With the operation member in the second position, the lens cover and the filter are retracted from the front surface of the lens. With the operation member in the third position, the lens is covered with the filter. The camera is provided also with a switch arranged to operate according to the shift of the operation member in such a way as to enable the camera to perform photographing when the member is either in the second or third position.

37 Claims, 5 Drawing Figures

CAMERA

BACKGROUND OF THE INVENTION

1. Field of the Invention

This invention relates to a camera having a lens cover and a filter arranged to be operable by one and the same operation member.

2. Description of the Prior Art

There have been known cameras of the kind incorporating a lens cover and a filter therein. For example, Japanese Laid-Open Utility Model Application No. SHO 58-150311 disclosed a camera of this kind. The lens cover and the filter are provided, respectively, with separate operation members. The separate arrangement of these operation members has caused an increase in the number of operation members, an increase in the probability of an erroneous operation and degradation of the operability of the camera. In addition to these problems, there has been the possibility that, during and before completion of a process of covering the front surface of the photo-taking lens with the filter by opening the lens cover and by turning the filter, a shutter release button might be inadvertently pushed to cause a failure of a photographing operation.

SUMMARY OF THE INVENTION

A first object of the present invention is to provide a camera wherein a lens cover is arranged to open and close the front surface of a photo-taking optical system; an auxiliary optical system such as a filter is arranged to move into and away from the optical path of the photo-taking optical system independently of the lens cover; operation means is arranged to be shiftable between first, second and third states; driving means is arranged to drive the lens cover to open and close the front surface of the photo-taking optical system in response to the shift of the operation means between the first and second states, and to insert and extract the auxiliary optical system into and from the optical path in response to the shift of the operation means between the second and third states thereof without driving the lens cover; and thus the lens cover can be opened and closed and the auxiliary optical system can be inserted and extracted by a single operation means.

A second object of this invention is to provide a camera of the kind having a lens cover and a filter, wherein inhibiting means is arranged to inhibit a photographing operation while the filter is moving into or out of the optical path of a photo-taking optical system even when the lens cover is open, so that photographing can be prevented from failing due to incomplete movement of the filter.

A third object of this invention is to provide a camera of the kind having a lens cover and an auxiliary optical system such as a filter arranged to be moveable into and out of the optical path of a photo-taking lens, wherein display, means is arranged to display within a view finder, the entering and withdrawing states of the auxiliary optical system into and out of the optical path, so that erroneous photographing can be prevented.

These and further objects and features of the invention will become apparent from the following detailed description of a preferred embodiment thereof taken in connection with the accompanying drawings.

DETAILED DESCRIPTION OF THE PREFERRED EMBODIMENT

Figure 1:
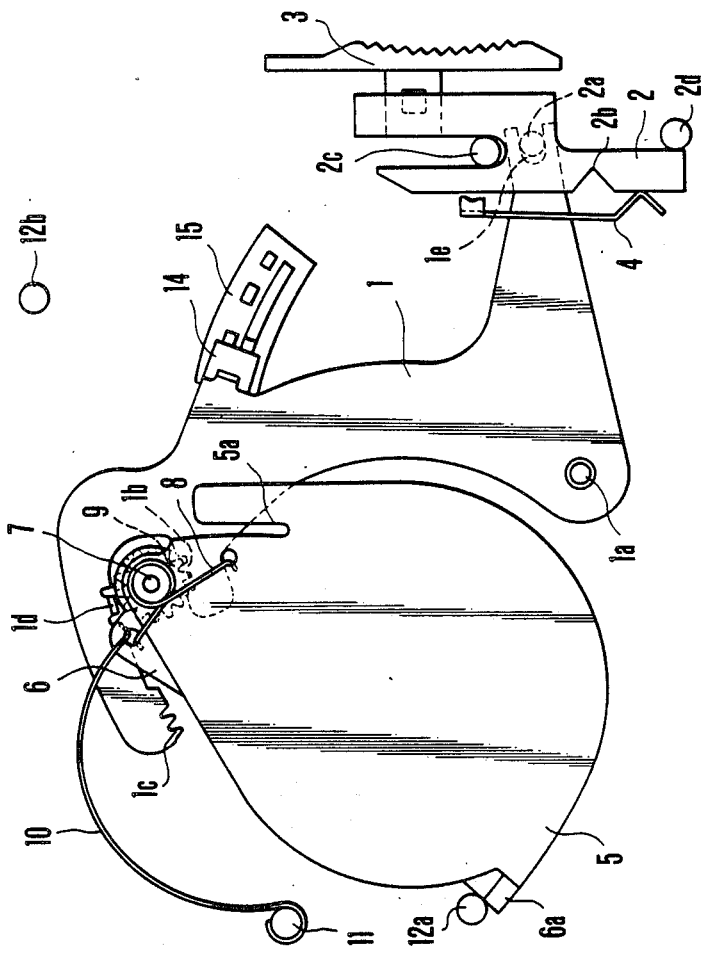
FIG. 1 shows an embodiment of this invention as in a state of having a photo-taking lens covered with a camera lens cover and a filter.
Figure 2:
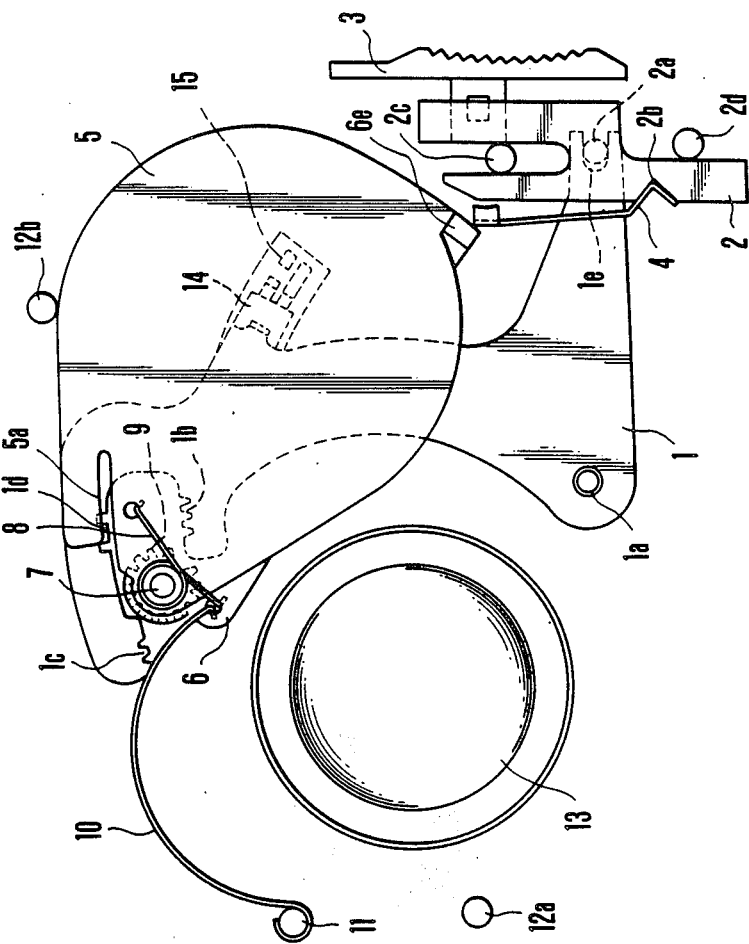
FIG. 2 shows the same embodiment as in a state of having the photo-taking lens not covered with the lens cover and the filter.
Figure 3:
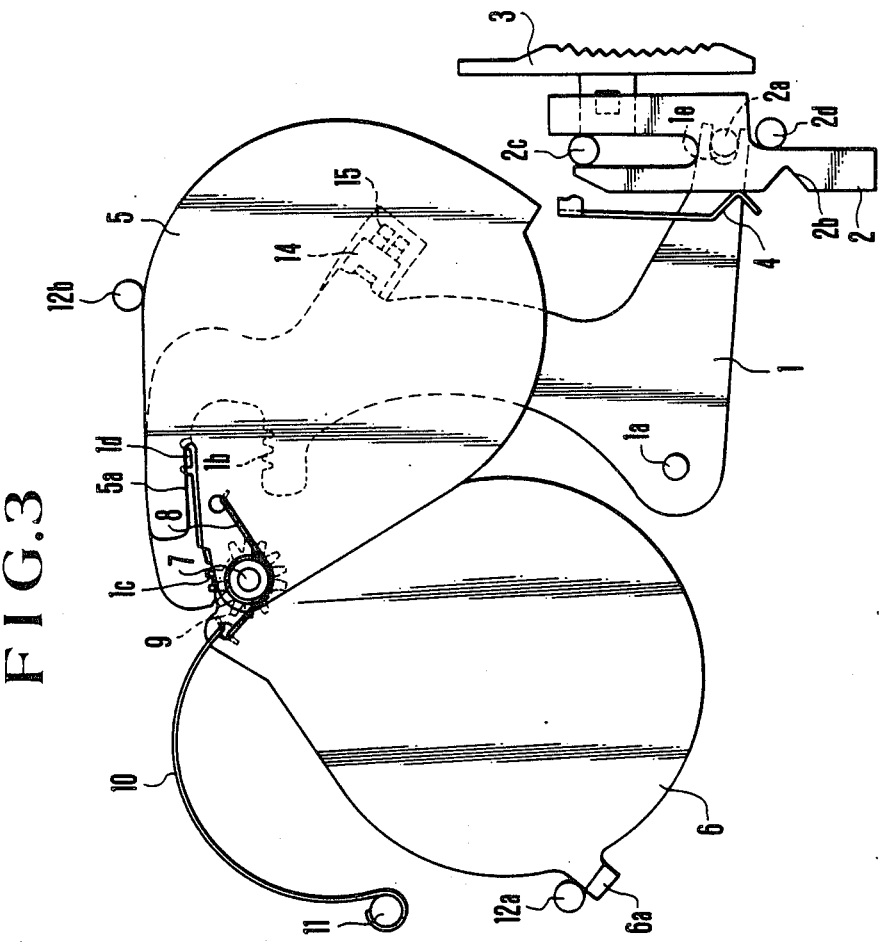
FIG. 3 shows the same embodiment as in a state of having the photo-taking lens covered solely with the filter.
Figure 4:
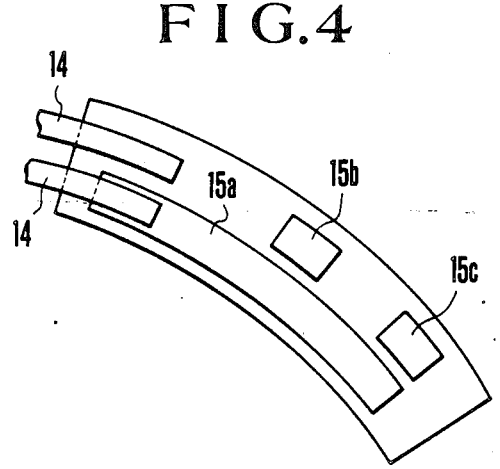
FIG. 4 is a detailed view of switch contacts which are shown in FIGS. 1, 2 and 3.

A preferred embodiment of this invention is arranged as described in the following with reference to the accompanying drawings: Referring to FIGS. 1, 2 and 3, an L-shaped turning lever 1 is arranged to turn on a shaft 1a. One end of the turning lever 1 is hooked. The fore end edge parts of the inner side of this hooked portion are formed into sawtooth parts 1b and 1c. A pawl 1d is arranged adjacent to the sawtooth part 1c. The other end of the turning lever 1 is formed into an engaging part 1e which is arranged to engage a slide lever 2. To the slide lever 2 is attached an operation lever 3. When this operation lever 3 is operated; the slide lever 2 slides while being guided by pins 2c and 2d. Another pin 2a, which is provided on the slide lever 2, engages the engaging part 1e of the turning lever 1. A leaf spring 4 is arranged to engage a notch 2b provided in the slide lever 2. A lens cover 5 and a soft-focus filter 6 are both arranged to be turnable on a shaft 7. The lens cover 5 is provided with a slit 5a which is arranged to engage the pawl 1d of the turning lever 1. A spring 8 is arranged between the lens cover 5 and the filter 6. A gear 9 is disposed on the shaft 7 in one unified body with the filter 6. The gear 9 is located within the hooked part of the turning lever 1 and is arranged to engage the sawtooth parts 1b and 1c. A toggle spring 10 is arranged between a fixing pin 11 and the filter 6 to urge the filter 6 to turn clockwise. The filter is prevented from turning clockwise with a protrudent part 6a of the filter 6 abutting on a stopper 12a. Meanwhile, the lens cover 5, which is urged by the force of the spring, is prevented from turning further by this protrudent part 6a of the filter 6. There is provided another stopper 12b which is arranged to stop the filter 6 from turning further when the toggle spring 10 is inverted to urge the filter 6 to turn counterclockwise. A phototaking lens 13 is arranged to be covered with the filter 6 which has its surface treated in the same manner as a known soft-focus filter. A slider 14 is arranged to operate in association with the turning lever 1. A conductor pattern 15 consists of a common pattern 15a and two separate patterns 15b and 15c, as shown in detail in FIG. 4.

Figure 5:
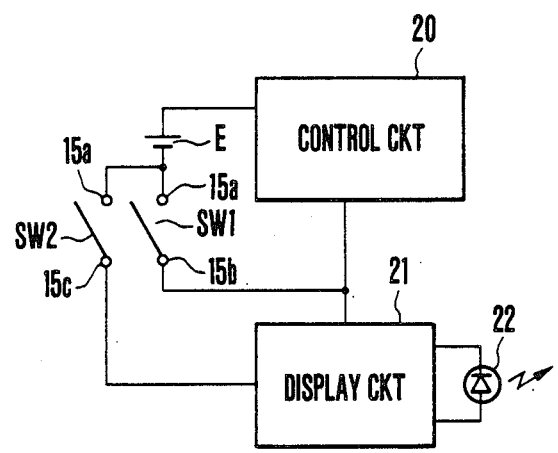
FIG. 5 is a block diagram showing the circuit arrangement of the camera shown in FIGS. 1, 2 and 3.

FIG. 5 is a circuit diagram showing the circuit arrangement of the camera. The illustration includes a power source battery E; a control circuit 20 of the camera; a display circuit 21; a display element 22; a switch SW1 which consists of the patterns 15a and 15b shown in FIG. 4; and another switch SW2 which consists of the patterns 15a and 15c shown in FIG. 4.

The camera, which is arranged in the manner as described above, operates in the following manner: Let us first assume that the lens cover 5 and the filter 6 are in a state as shown in FIG. 1. In this instance, the photo-taking lens 13 is covered with the lens cover 5 and the filter 6. The switches SW1 and SW2 are open. Therefore, no power supply is effected from the power source battery E to the control circuit 20 and the display circuit 21. Under this condition, when the operation lever 2 is slid downward, the slide lever 2 also slides downward. This causes the turning lever 1 to turn clockwise. Meanwhile, the sawtooth part 1b of the turning lever 1 is engaging the gear 9 of the filter 6 under the condition of FIG. 1. Therefore, with the turning lever 1 turning clockwise, the filter 6 turns counterclockwise against the force of the toggle spring 10. The protrudent part 6a of the filter 6 pushes the lens cover 5 to turn counterclockwise together with the filter 6. When the filter 6 and the lens cover 5 turn to a predetermined extent passing through the neutral point of the toggle spring 10, the toggle spring 10 then comes to urge the filter 6 to turn counterclockwise. After that, the sawtooth part 1b of the turning lever 1 disengages from the gear 9 of the filter 6. This allows the filter 6 to be turned further counterclockwise by the spring force of the toggle spring 10. The filter 6 comes to abut on the stopper 12b and is held there. After the disengagement of the sawtooth part 1b of the turning lever 1 from the gear 9, when the turning lever 1 further turns to a slight degree, the pawl 1d of the lever 1 engages the slit 5a of the lens cover 5. Then, the leaf spring 4 comes to engage the notch 2b of the slide lever 2. This brings the slide lever 2 and the turning lever 1 to a stop at their positions as shown in FIG. 2. Under the condition of FIG. 2, the lens cover 5 and the filter 6 together have moved away from the front surface of the photo-taking lens 13 to permit a normal photographing operation. With the lens cover 5 opened as shown in FIG. 2, the slider 14 brings about a conductive state between the conductive patterns 15a and 15b. The switch SW1 thus turns on to bring the control circuit 20 of the camera into an energized state.

When the operation lever 3 is slid further downward under the condition of FIG. 2 against the force of the engagement of the leaf spring 4 and the notch 2b of the slide lever 2, the turning lever 1 again turns clockwise to have the sawtooth part 1c come to engage the gear 9. The engagement of the gear 9 with the sawtooth part 1c causes the filter 6 to turn clockwise. At this time, since the lens cover 5 is urged by the spring 8 in the clockwise direction relative to the filter 6, the lens cover 5 tries to make a clockwise turn together with the filter 6. However, this is prevented by engagement of the pawl 1d of the turning lever 1 and the slit 5a of the lens cover 5. The filter 6 thus alone turns clockwise. When the filter 6 turns to a predetermined extent, the toggle spring 10 comes again to urge the filter 6 to turn clockwise. This causes the filter 6 to turn clockwise until the protrudent part 6a comes to be stopped by the stopper 12a. At that time, the gear 9 and the sawtooth part 1c of the turning lever 1 remain engaged with each other. Therefore, the turning lever 1 comes to a stop. The slide lever 2 and the operation lever 3 also come to a stop. There obtains a condition as shown in FIG. 3. Under this condition, the lens cover 5 is away from the front surface of the photo-taking lens 13 while the lens 13 is in a state of being covered with the soft focus filter 6. Photographing under this condition gives a picture with a soft focus effect.

With the front surface of the photo-taking lens 13 covered with the filter 6 as mentioned above, the slider 14 brings about a conductive state between the conductive patterns 15a and 15c. The switch SW2 thus turns on to permit the power supply voltage to be supplied to both the control circuit 20 and the display circuit 21. Therefore, the camera is in an operative state. A display can be made by the display element 22. This element 22 is disposed within a view finder and is arranged to inform the photographer that the front surface of the photo-taking lens is covered with the filter 6. The display arrangement effectively reminds the photographer of the insertion of the soft focus filter 6.

The switches SW1 and SW2 become nonconductive while the slider 14 is halfway between the position of the pattern 15b and that of another pattern 15c during its movement between these positions. This renders the camera inoperative. Therefore, this arrangement precludes the occurrence of a trouble that a photographing operation is inadvertently performed before the photo-taking lens is completely covered with the filter 6.

When the operation lever 3 is slid upward instead of sliding it downward, the camera operates in a manner reverse to the operation described above. Then, there obtains a condition either as shown in FIG. 2 or as shown in FIG. 1.

In the specific embodiment described, a soft-focus filter is used for covering the front surface of the photo-taking lens. However, a filter of some other kind may be used in place of the soft-focus filter. Further, the filter may be replaced with any other auxiliary optical system, such as an optical system to be used for shifting the focal length. The inserting position does not have to be in front of the photo-taking lens but may be set at any suitable point as long as it is located within the optical path of the photo-taking lens.

The filter is arranged to be in an interposed state in between the lens cover and the photo-taking lens and is thus covering the lens when the lens is in a state of being covered with the lens cover in the case of the embodiment described in the foregoing. This arrangement increases the strength of the lens cover against any pushing force that might be exerted thereon from outside while the camera is being carried.

The camera according to this invention as described in the foregoing is provided with a lens cover which is arranged to open and close the front surface of a photo-taking optical system; an auxiliary optical system which is arranged to be operable independently of the lens cover and to move into and out of the optical path of the photo-taking optical system; operation means which is arranged to be shiftable between first, second and third states thereof; and driving means which is arranged to drive the lens cover to open and close in response to the shift of the operation means between the first and second states thereof and to insert and extract the auxiliary optical system into and from the optical path in response to the shift of the operation means between the second and third states without driving the lens cover. The camera according to the invention is thus capable of opening and closing the lens cover and inserting and extracting the auxiliary optical system by a single operation means with simple structural arrangement. Therefore, the reduction in the number of operation members permits simple and accurate operation of the camera.

Further, in accordance with this invention, even when the lens cover is in an open state, any photographing operation is inhibited by inhibiting means while the filter is still in the process of coming into or moving out of the optical path of the photo-taking lens. Therefore, it is an advantage of the camera according to the invention that the possibility of a photographing failure due to an inadvertent pushing operation performed on the shuter release button during the filter inserting or extracting process and before completion thereof can be effectively prevented.

It is another advantage of the invention that: A camera of the kind having an auxiliary optical system arranged to be insertable and extractable into and out of the optical path of a photo-taking lens is provided with display means which is arranged to make a display within a view finder showing the insertion or extraction of the auxiliary optical system. This arrangement reminds the photographer of the insertion of the auxiliary optical system when the use of the auxiliary optical system is out of his or her mind, so that erroneous photographing can be prevented. This advantage is salient especially in case that the auxiliary optical system is a filter, because, unlike in the case of an auxiliary optical system to be used for change-over of the focal length, peeping into a view finder arranged otherwise does not readily remind the photographer of the fact that the filter is being used.

What is claimed is:

1. A camera comprising:
   (a) a protective cover arranged to open and close a front surface of a photo-taking optical system;
   (b) an auxiliary optical system arranged to move into and out of a optical path of said photo-taking optical system, said auxiliary optical system being arranged to be operable independently of said protective cover;
   (c) operation means arranged to be shiftable between first, second and third states thereof; and
   (d) driving means arranged to drive said protective cover to open and close in response to a shift of said operation means between said first and second states thereof and to insert and extract said auxiliary optical system into and out of said optical path in response to a shift of said operation means between said second and third states while having said protective cover kept at a predetermined open position thereof.

2. A camera according to claim 1, wherein said auxiliary optical system includes a filter.

3. A camera according to claim 1, further comprising: inhibiting means for inhibiting a photographing operation while said auxiliary optical system is in the process of coming into or moving out of the optical path of said photo-taking optical system and before completion thereof even when said protective cover is in an open state.

4. A camera ccording to claim 3, wherein said auxiliary optical system includes a filter.

5. A camera according to claim 1, further comprising: display means for displaying the state of said auxiliary optical system coming into or moving out of said optical path.

6. A camera according to claim 5, wherein said display means includes lighting up means.

7. A camera according to claim 5, wherein said display means includes switch means arranged to operate in response to the operation of said driving means.

8. A camera according to claim 1, wherein said protective cover includes a rotating shaft for the opening and closing operations of said lens cover.

9. A camera according to claim 1, wherein said auxiliary optical system includes a rotating shaft for the inserting and extracting operations thereon.

10. A camera according to claim 9, wherein said protective cover includes a rotating shaft for the opening and closing operations thereof.

11. A camera according to claim 10, wherein said auxiliary optical system and said protective cover are arranged to turn on one and the same shaft.

12. A camera according to claim 1, wherein said driving means includes a gear part which is arranged to be capable of engaging and disengaging with and from said auxiliary optical system.

13. A camera according to claim 1, further comprising:
   an elastic member interlocking said protective cover and said auxiliary optical system with each other.

14. A camera according to claim 1, further comprising:
   a toggle spring arranged to urge said auxiliary optical system.

15. A camera according to claim 1, wherein said auxiliary optical system includes an interlocking part which is arranged to interlock said auxiliary optical system and said protective cover with each other.

16. A camera according to claim 1, wherein, when said protective cover is in a state of covering the front surface of said photo-taking optical system, said auxiliary optical system is in a state of being interposed in between said protective cover and said photo-taking optical system and is also covering the front surface of said photo-taking optical system.

17. A camera comprising:
   (a) a protective cover arranged to open and close a front surface of a photo-taking optical system;
   (b) a filter arranged to move into and out of an optical path of said photo-taking optical system; and
   (c) inhibiting means for inhibiting a photographing operation while said filter is in the process of coming into or moving out of the optical path of said photo-taking optical system and before completion thereof even when said protective cover is in an open state, wherein said inhibiting means includes a switch of a control circuit arranged to control a photographing operation , said switch being arranged to operate according to the operating position of said filter and to inhibit a photographing operation while said filter is still in the process of moving into or out of the optical path of said photo-taking optical system.

18. A camera according to claim 17, wherein said switch is disposed at driving means which is provided for inserting and extracting said filter into and from said optical path; and said driving means includes a gear part which is capable of engaging and disengaging with and from said filter.

19. A camera according to claim 17, wherein, when said protective cover is in a state of covering the front surface of said photo-taking optical system, said auxiliary optical system is in a state of being interposed in between said protective cover and said photo-taking optical system and is also covering the front surface of said photo-taking optical system.

20.
A camera comprising:

(a) a protective cover arranged to open and close a front surface of a photo-taking optical system;

(b) an auxiliary optical system arranged to move into and out of an optical path of said photo-taking optical system;

(c) display means for displaying within a view finder a moving condition of said auxiliary optical system; and (d) switching means for rendering said display means inoperative when said protective cover is in a closed state.

21. A camera according to claim 20, wherein said auxiliary optical system includes a filter.

22. A camera according to claim 20, wherein said display means includes lighting up means.

23. A camera according to claim 20, wherein, when said protective cover is in a state of covering the front surface of said photo-taking optical system, said auxiliary optical system is in a state of being interposed in between said protective cover and said photo-taking optical system and is also covering the front surface of said photo-taking optical system.

24. A camera comprising:

(a) a protective cover arranged to open and close a front surface of a photo-taking optical system;

(b) an auxiliary optical system arranged to move into and out of an optical path of said photo-taking optical system, said auxiliary optical system being arranged to be operable independently of said protective cover;

(c) operation means arranged to be changeable between first, second and third states thereof; and (d) driving means for driving said protective cover to open and close in response to a change of said operation means between said first and second states thereof and to insert said auxiliary optical system into said optical path in response to a change of said operation means to said third state while having said protective cover kept at a predetermined open position thereof.

25. A camera according to claim 24, wherein said auxiliary optical system includes a filter.

26. A camera according to claim 24, further comprising:

inhibiting means for inhibiting a photographing operation while said auxiliary optical system is in the process of coming into or moving out of the optical path of said photo-taking optical system and before completion thereof even when said protective cover is in an open state.

27. A camera according to claim 26, wherein said auxiliary optical system includes a filter.

28. A camera according to claim 24, further comprising:

informing means for informing the state of said auxiliary optical system coming into or moving out of said optical path.

29. A camera according to claim 24, further comprising an elastic member for associating said protective cover and said auxiliary optical system with each other.

30. A camera according to claim 24, wherein said driving means drives said protective cover and said auxiliary optical system integrally in response to said change of said operation means between said first and second state thereof, and drives said auxiliary optical system, independently from said protective cover, while said lens cover is maintained at said predetermined open position in response to said change of said operation means.

31. A camera according to claim 30, further comprising a toggle spring for biasing said protective cover and said auxiliary optical system in the driving direction.

32. A camera comprising:

(a) a protective cover arranged to open and close a front surface of a photo-taking optical system;

(b) an auxiliary optical system arranged to move into and out of an optical path of said photo-taking optical system, said auxiliary optical system being arranged to be operable independently of said protective cover;

(c) operation means sequentially shiftable from first, second and third positions; and (d) drive means for driving said protective cover to open in response to the shift of said operation means from said first position to said second position, and for driving said auxiliary optical system into said optical path while maintaining said protective cover in a predetermined opened position in response to the shift of said operation means from said second position to said third position.

33. A camera according to claim 32, wherein said drive means includes inversion means for inverting the driving direction of said auxiliary optical system while it shifts in one direction to drive said auxiliary optical system out of said optical path and again drive it into said optical path.

34. A camera according to claim 33, wherein said auxiliary optical system includes a filter.

35. A camera comprising:

(a) a protective cover arranged to open and close a front surface of a photo-taking optical system;

(b) an auxiliary optical system arranged to move into and out of an optical path of said photo-taking optical system;

(c) informing means for informing, within a view finder, a moving condition of said auxiliary optical system; and (d) switching means for rendering said information means inoperative when said protective cover is in a close state.

36. A camera according to claim 35, wherein said auxiliary optical system includes a filter.

37. A camera according to claim 35, wherein, when said protective cover is in a state of covering the front surface of said photo-taking optical system, said auxiliary optical system is in a state of being interposed in between said protective cover and said photo-taking optical system and is also covering the front surface of said photo-taking optical system.

* * * * *